US009785147B1

(12) United States Patent
McDermott et al.

(10) Patent No.: US 9,785,147 B1
(45) Date of Patent: Oct. 10, 2017

(54) PIXEL BASED IMAGE TRACKING SYSTEM FOR UNMANNED AERIAL VEHICLE (UAV) ACTION CAMERA SYSTEM

(71) Applicant: Trace Live Network Inc., Calgary (CA)

(72) Inventors: Craig McDermott, Cedar Rapids, IA (US); Bruce McDonald, Iowa, IA (US)

(73) Assignee: Trace Live Network Inc., Calgary (CA)

( * ) Notice: Subject to any disclaimer, the term of this patent is extended or adjusted under 35 U.S.C. 154(b) by 0 days.

(21) Appl. No.: 15/256,193

(22) Filed: Sep. 2, 2016

Related U.S. Application Data

(63) Continuation of application No. 14/825,956, filed on Aug. 13, 2015, now Pat. No. 9,442,485.

(Continued)

(51) Int. Cl.
    *G05D 1/00* (2006.01)
    *G05D 1/10* (2006.01)
    (Continued)

(52) U.S. Cl.
    CPC ......... *G05D 1/0094* (2013.01); *B64C 39/024* (2013.01); *B64D 47/08* (2013.01); *G05D 1/101* (2013.01); *G05D 1/12* (2013.01); *G06K 9/0063* (2013.01); *G06K 9/00369* (2013.01); *G06K 9/6202* (2013.01); *G06T 7/248* (2017.01); *H04N 7/183* (2013.01); *B64C 2201/024* (2013.01); *B64C 2201/108* (2013.01); *B64C 2201/127* (2013.01); *B64C 2201/141* (2013.01); *G06T 2207/10016* (2013.01);
    (Continued)

(58) Field of Classification Search
    CPC ........ G05D 1/0094; G05D 1/101; G05D 1/12; B64C 39/024; B64C 47/08; B64C 2201/024; B64C 2201/108; B64C 2201/127; B64C 2201/141; G06K 9/0063; G06K 9/00369; G06K 9/6202; G06T 2207/10016–2207/10032; G06T 2207/30196–2207/30221
    See application file for complete search history.

(56) References Cited

U.S. PATENT DOCUMENTS 9,164,506 B1    10/2015   Zang
2009/0157233 A1*  6/2009   Kokkeby .............. G01S 3/7864
                                                            701/3

(Continued)

*Primary Examiner* — Richard Camby
(74) *Attorney, Agent, or Firm* — Suiter Swantz pc llo

(57) ABSTRACT

An unmanned aerial vehicle (UAV) may select a subject to track or follow and capture images including the subject. A visual recognition system of the UAV may generate a profile of reference images portraying the subject breaking the reference images down into pixel sets corresponding to the subject and his/her components and distinguishing characteristics (body parts, clothing, facial features, accessories). The visual recognition system may break the incoming stream of incoming images into pixel sets, analyzing the pixel sets to distinguish the subject from his/her surroundings (i.e., in a crowd) and determine movement of the subject and the current orientation of the UAV to the subject. The UAV may then change its heading, velocity, or position based on any difference between the current orientation and the desired or predetermined orientation between the UAV and the subject.

20 Claims, 7 Drawing Sheets

Related U.S. Application Data

(60) Provisional application No. 62/036,919, filed on Aug. 13, 2014.

(51) Int. Cl.
*B64C 39/02* (2006.01)
*B64D 47/08* (2006.01)
*G05D 1/12* (2006.01)
*H04N 7/18* (2006.01)
*G06K 9/00* (2006.01)
*G06K 9/62* (2006.01)
*G06T 7/246* (2017.01)

(52) U.S. Cl.
CPC ............... *G06T 2207/10032* (2013.01); *G06T 2207/30196* (2013.01); *G06T 2207/30221* (2013.01)

(56) References Cited

U.S. PATENT DOCUMENTS

| | | | |
|---|---|---|---|
| 2009/0187299 A1* | 7/2009 | Fregene | G05D 1/0094 701/23 |
| 2011/0301784 A1 | 12/2011 | Oakley et al. | |
| 2012/0143808 A1* | 6/2012 | Karins | G06N 7/005 706/46 |
| 2012/0200703 A1 | 8/2012 | Nadir et al. | |
| 2012/0307042 A1* | 12/2012 | Lee | G08G 5/0069 348/114 |
| 2013/0176423 A1 | 7/2013 | Rischmuller et al. | |

\* cited by examiner

PIXEL BASED IMAGE TRACKING SYSTEM FOR UNMANNED AERIAL VEHICLE (UAV) ACTION CAMERA SYSTEM

For purposes of the USPTO extra-statutory requirements, the present application constitutes a continuation of United States patent application entitled PIXEL BASED IMAGE TRACKING SYSTEM FOR UNMANNED AERIAL VEHICLE (UAV) ACTION CAMERA SYSTEM, naming Craig McDermott and Bruce McDonald as inventors, filed Aug. 13, 2015, application Ser. No. 14/825,956, which is currently co-pending.

CROSS-REFERENCE TO RELATED APPLICATIONS

This application claims priority under 35 U.S.C. §119(e) to provisional U.S. Patent Application 62/036,919 filed on Aug. 13, 2014. Said U.S. Patent Application 62/036,919 is herein incorporated by reference in its entirety.

TECHNICAL FIELD

Embodiments of the present disclosure relate generally to unmanned aerial vehicles (UAVs) and more particularly to systems and methods for following or tracking a moving target via a UAV.

BACKGROUND

An unmanned aerial vehicle (UAV) may include an onboard action camera system whereby a camera captures one or more images from the vantage point of the UAV, which may be streamed in real time or near real time from the UAV to a computing device or communications device via wireless link. These streaming images may provide a unique firsthand perspective of a skier, skateboarder, or other athlete as they progress through a course or routine, if the UAV can be made to track or follow its subject from a consistent perspective relative to the subject, accounting for changes in direction or perspective along with the subject. This may be particularly challenging if a human subject is moving through a crowd of other persons, who may themselves be moving, and some of whom may bear more than a cursory visual resemblance to the subject. It may be desirable for a UAV to track or follow a subject (ex.—target individual) by analyzing captured images on a pixel-by-pixel basis to track the subject's movement through the frame, distinguishing the subject from other persons and background elements and directing the UAV to respond to detected changes in direction or velocity on the part of the subject.

SUMMARY

In a first aspect, embodiments of the present disclosure are directed to an unmanned aerial vehicle (UAV). For example, the UAV may include an airframe and a series of rotors fixed thereto and configured to rotate at variable rotor speeds. The UAV may include an attitude control system coupled to the rotors and configured to adjust the rotor speed of each rotor. The UAV may include a camera configured to capture images, the images including reference images associated with a subject photographed at a first orientation of the UAV and the subject, and tracking images associated with the subject photographed at a second orientation of the UAV and the subject (i.e., while the UAV is tracking the subject). The UAV may include a visual recognition system coupled to the camera, and configured to generate a profile associated with a subject, the profile including at least one reference pixel set based on a reference image of the subject, the reference pixel set including reference pixel subsets corresponding to components of the subject. The visual recognition system may further generate tracking pixel sets associated with tracking images, the tracking pixel set including component pixel subsets which may correspond to components of the subject. The visual recognition system may compare tracking pixel sets and subsets to reference pixel sets (to identify a subject) or other tracking pixel sets (to locate a subject or track its movement). The UAV may include a subject tracking system which directs the attitude control system to follow the subject based on the current orientation of the UAV to the subject. The subject tracking system may compare the current orientation to a predetermined or desired orientation from which the UAV is directed to follow the subject, and direct the attitude control system to adjust rotor speeds based on the difference between the current and desired orientations (i.e., to return the UAV to a desired orientation).

In a further aspect, embodiments of the present disclosure are directed to a method for tracking a subject via an unmanned aerial vehicle (UAV), the method including: capturing at least one first image associated with the subject via a camera of the UAV, each first image of the at least one first image associated with a first orientation of the UAV and the subject: generating a profile associated with the subject, the profile including at least one first pixel set corresponding to each first image, the at least one first pixel set including one or more first pixel subsets; following the subject according to a second orientation of the UAV and the subject; capturing at least one second image via the camera of the UAV; generating a second pixel set based on the at least one second image, each second pixel set including at least one second pixel subset; determining at least one third orientation of the UAV and the subject by comparing the at least one second pixel set to one or more of the at least one first pixel subset and the at least one second pixel subset; comparing the at least one determined third orientation of the UAV and the subject to the second orientation of the UAV and the subject; and adjusting at least one rotor speed of the UAV based on comparing the at least one determined third orientation of the UAV and the subject and the second orientation of the UAV and the subject.

BRIEF DESCRIPTION OF THE FIGURES

Embodiments of the present disclosure may be better understood by those skilled in the art by reference to the accompanying figures in which.

DETAILED DESCRIPTION

Features of the present disclosure in its various embodiments are exemplified by the following descriptions with reference to the accompanying drawings, which describe the invention with further detail. These drawings depict only selected embodiments of the invention, and should not be considered to limit its scope in any way.

Figure 1:
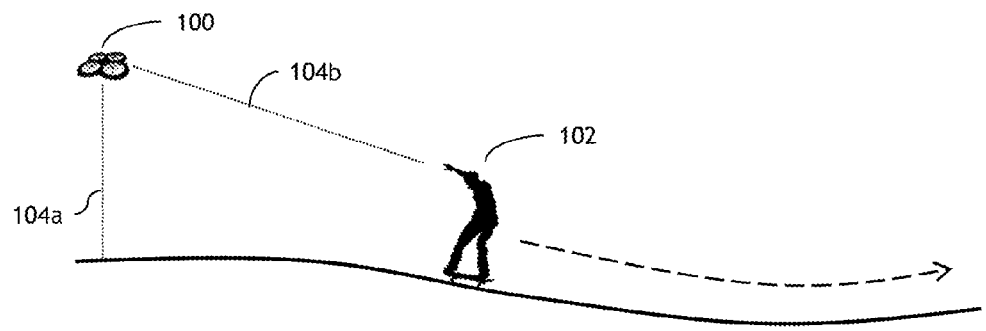
FIG. 1 is an illustration of an unmanned aerial vehicle (UAV) according to embodiments of the present disclosure.

Referring to FIG. 1, in one embodiment an unmanned aerial vehicle 100 is programmed, or remotely controlled by an operator (not shown), to track or follow a subject 102 at a desired orientation. For example, the UAV 100 may include an onboard camera (not shown) for capturing still images (or a continuous stream of images) portraying the subject 102 from the vantage point of the UAV 100. As the subject 102 moves (e.g., progressing through a race course or around a skatepark or similar venue), the UAV 100 may follow the subject 102, maintaining a consistent orientation between the UAV 100 and the subject 102 (which may include, e.g., a predetermined height 104a and/or a predetermined distance 104b relative to the subject 102) and capturing images from a consistent perspective.

Figure 2:
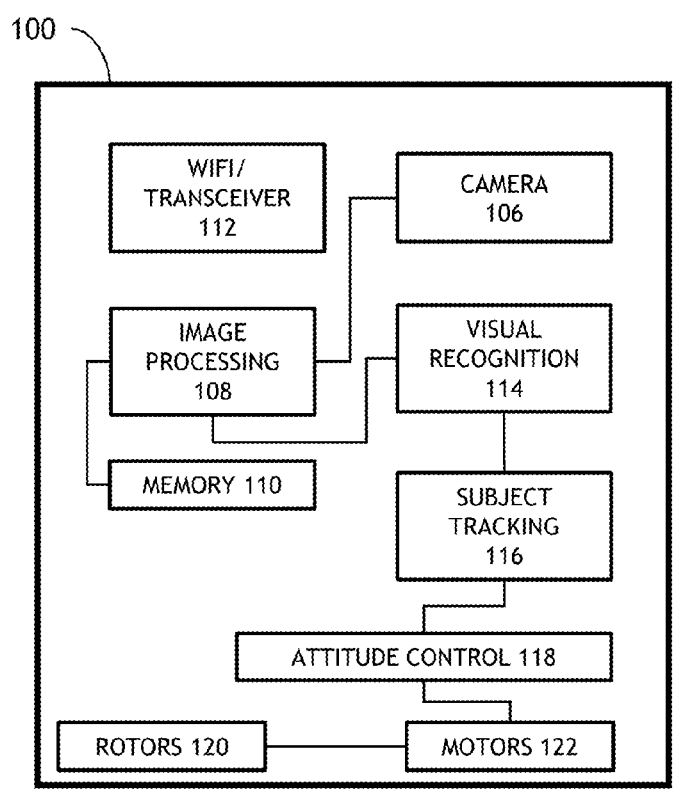
FIG. 2 is a block diagram of a UAV according to embodiments of the present disclosure.

Referring to FIG. 2, the UAV 100 may include an onboard camera 106. For example, the camera 104 may be coupled to an image processing system 108. The image processing system 108 may compress the incoming stream of images for broadcast or retransmission. The image processing system 106 may store a processed image stream based on captured images in onboard memory 110, or transmit the image stream to a wireless device or third party viewer via a wireless transceiver 112. The UAV 100 may include a visual recognition system 114. The visual recognition system 114 may include one or more processors configured to analyze captured images and identify the subject 102, or to determine whether the captured images portray the subject 102. The visual recognition system 114 may further determine the current orientation of the UAV to the subject. For example, if the subject 102 speeds up, slows down, or changes direction while being tracked by the UAV 100, its orientation relative to the UAV 100 may change. The UAV 100 may include a subject tracking system 116. For example, the subject tracking system 116 may include one or more processors for calculating, based on changes in orientation determined by the visual recognition system 114, any changes in heading, position, or velocity on the part of the UAV 100 in order to maintain a predetermined orientation of the UAV to the subject 102. The subject tracking system 116 may then direct the attitude control system 118 of the UAV 100 to execute any necessary changes in heading, position, or velocity by varying the rotational speed of one or more rotors 120 of the UAV. The rotor speeds of each rotor 120 may be directly controlled by one or more motors 122. For example, a multi-rotor UAV 100 may include four, six, eight, or any other appropriate number of rotors 120. Adjusting the speed of one or more rotors 120 may control the height of the UAV 100, rotate the UAV 100 along multiple rotational axes or degrees of freedom, or propel the UAV 100 in any desired direction at variable speeds.

Figure 3:
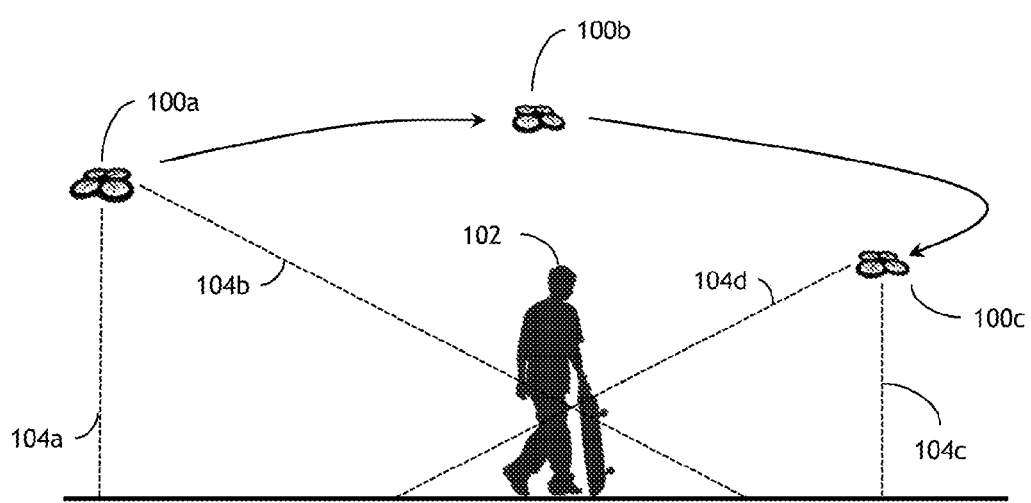
FIG. 3 is an illustration of a UAV according to embodiments of the present disclosure.

Referring to FIG. 3, the visual recognition system 114 (not shown) of the UAV 100 may generate a visual profile (ex.—footprint) corresponding to the subject 102 based on multiple images of the subject 102 captured from various positions 100a, 100b, 100c of the UAV 100. For example, the UAV 100 may rotate around the subject 102, capturing images of the subject 102 from various angles, distances (104b, 104d) or heights (104a, 104c).

Figure 4A:
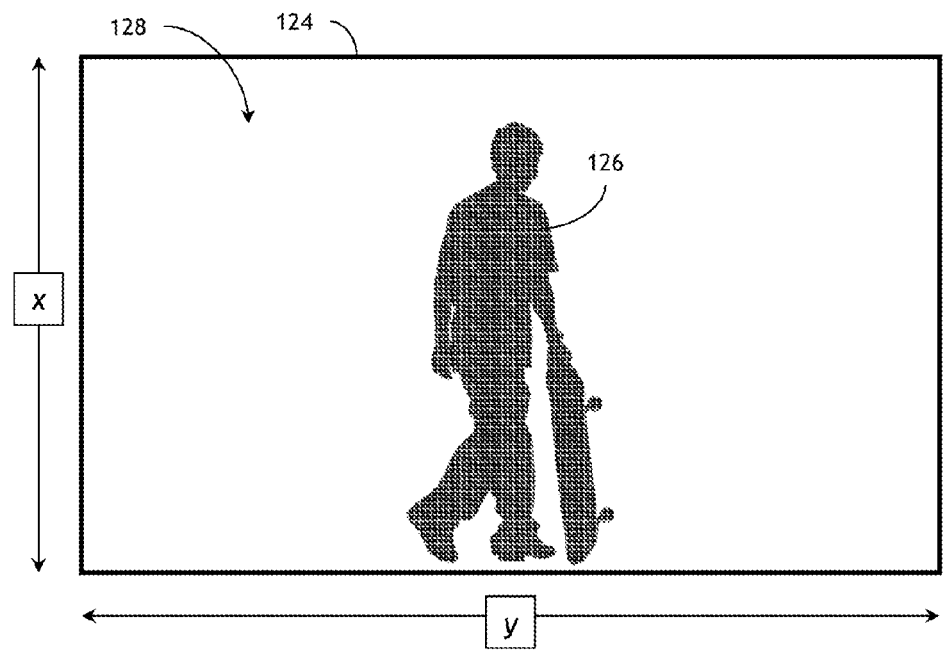
FIGS. 4A and 4B illustrate camera views of a UAV according to embodiments of the present disclosure.

Referring also to FIG. 4A, the visual recognition system 114 may generate a profile of the subject 102 by generating a pixel set 124 based on each captured image of the subject 102. As each image captured by the camera 106 has a predetermined image resolution (e.g., X pixels high and Y pixels wide), each pixel set 124 may comprise exactly XY pixels. Each pixel set may include a subject pixel subset 126 (i.e., those pixels corresponding to, or portraying, the subject 102) and a non-subject pixel subset 128 (i.e., those pixels not corresponding to the subject 102). A subject pixel subset 126 may be stored in onboard memory 110 and used by the visual recognition system 114 as a reference image of the subject 102. For example, if a subject pixel subset 126 is derived from an image captured by the camera 106 at a known distance or angle, the visual recognition system 114 may use the relative height or size of the subject pixel subset 126 (relative to the frame 124) to analyze subsequent images of the subject 102 captured by the camera 106 to interpolate the current distance, angle, or orientation of the UAV 100 to the subject 102.

Figure 4B:
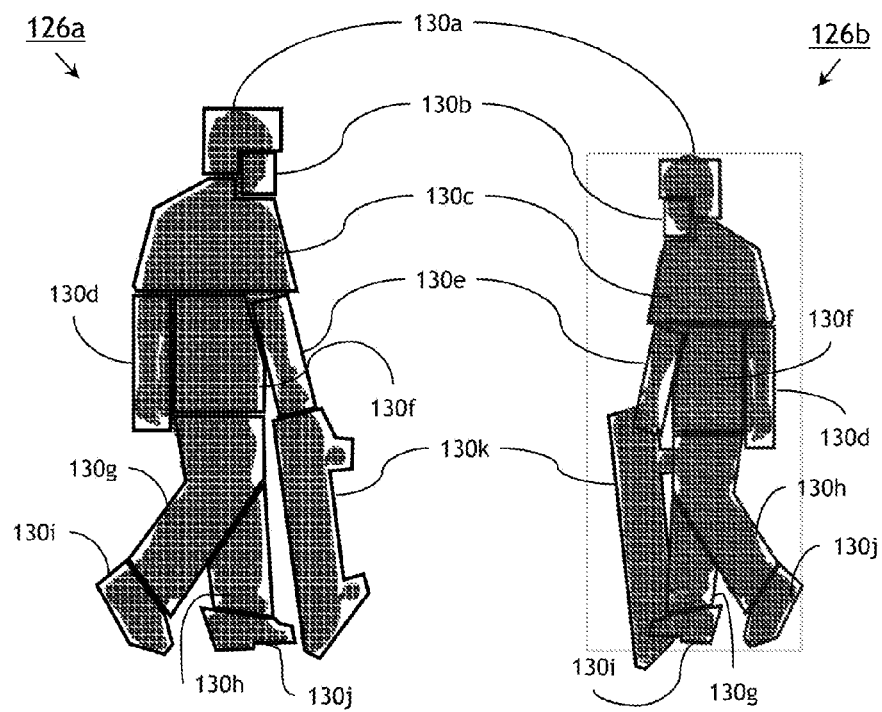

Referring also to FIG. 4B, the visual recognition system 114 may further divide each subject pixel subset 126 into component pixel subsets in order to provide a subject profile with more information about the individual components of a subject 102 in order to assist the visual recognition system 114 in identifying the subject 102 from captured images in which the subject 102 is portrayed in a crowd, or surrounded by objects of similar size or appearance. For example, multiple subject pixel subsets 126a, 126b of a human subject 102 (e.g., a skateboarder) may be analyzed to define component pixel subsets 130, each component pixel subset 130 corresponding to a body part, an accessory, an article of clothing, or a distinguishing feature of the subject 102. A subject pixel subset 126a corresponding to the subject 102 may include a component pixel subset corresponding to the subject's head (ex.—hair, helmet) (130a); the subject's face and facial features (130b); the subject's upper and lower torso (ex.—shirt, jacket) (130c, 130f); the subject's forearms (130d, 130e); the subject's legs (ex.—pants) (130g, 130h); the subject's feet (ex.—shoes) (130i, 130j); or the subject's accessories (ex.—skateboard 130k). The visual recognition system 114 may use pixel matching to define common pixels between different component pixel subsets 130 corresponding to the same object (e.g., when two component pixel subsets 130 are based on consecutive images). Depending on the angle, distance, or orientation of the image on which a subject pixel subset 126a, 126b is based, a set of component pixel subsets 130 corresponding to the same object may have different shapes or sizes. The visual recognition system 114 may determine position information for one or more component pixel subsets 130 (i.e., the UAV camera angle to which a given component pixel subset 130 corresponds) by comparing aspects of the individual pixels or groups of pixels comprising a component pixel subset 130. For example, the visual recognition system 114 may note similarities or differences in hue, texture, or reflectivity to determine common patterns in skin tone, complexion, hair color and texture, facial features, or clothing of the subject 102. The visual recognition system 114 may note changes in shape or position in the component pixel subsets 130 of two subject pixel subsets 126a, 126b based on different images. The visual recognition system 114 may identify a given component pixel subset 130 based on its edges and neighboring component pixel subsets 130. For example, a component pixel subset 130b corresponding to the facial features of the subject 102 can be identified by shared edges with its neighboring component pixel subsets 130a (corresponding to the subject's head) and 130*c* (corresponding to the subject's upper torso), and distinctive color and texture patterns (e.g., helmet vs. face, neck vs. shirt) may be used to identify these shared edges.

Figure 5A:
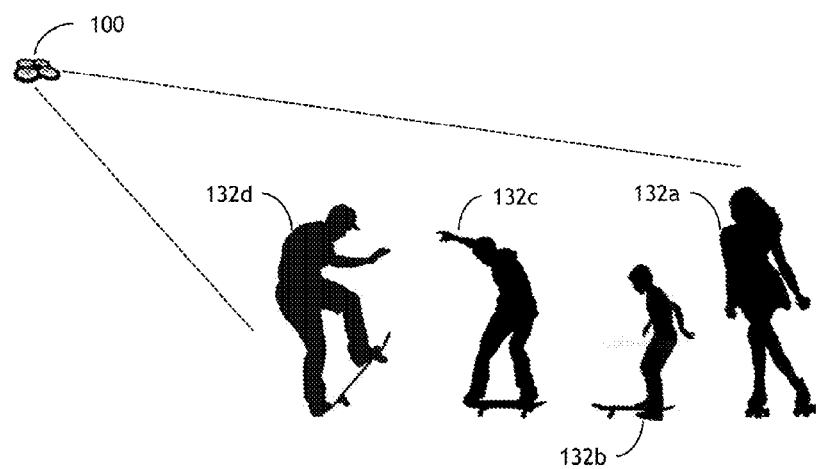
FIG. 5A is an illustration of a UAV according to embodiments of the present disclosure.
Figure 5B:
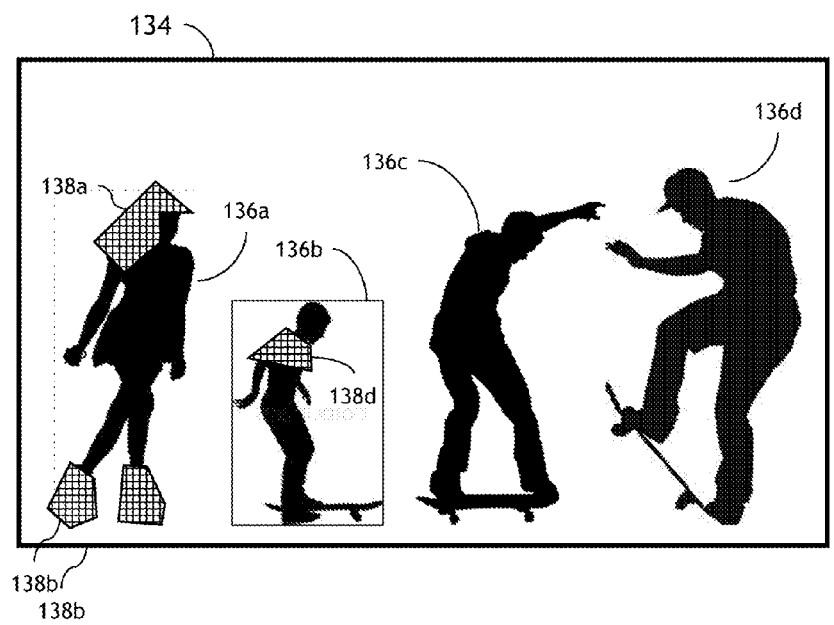
FIGS. 5B, 6, and 7 illustrate camera views of a UAV according to embodiments of the present disclosure.

The visual recognition system 114 of the UAV 100 may use one or more subject profiles to identify and lock onto a selected subject 102 from captured images, determine the current orientation of the UAV 100 to the subject 102, and calculate any necessary course changes via the subject tracking system 116 of the UAV 100. Referring to FIG. 5A, the UAV 100 may encounter multiple individuals 132, all of whom bear at least a cursory resemblance to the subject 102 (and one of whom may be the subject 102). The camera 106 of UAV 100 may capture images including potential subjects 132*a*, 132*b*, 132*c* and 132*d*. The visual recognition system 114 may generate a current pixel set 134 based on the most recently captured image. Referring also to FIG. 5B, the current pixel set 134 may include a non-subject pixel set 126 not corresponding to any subject or potential subject and several potential subject pixel sets 136*a*, 136*b*, 136*c*, and 136*d*, any of which may correspond to a subject pixel set 126. For example, the visual recognition system 114 may determine to a high degree of confidence that pixel subsets 136*a* and 136*b* do not correspond to the subject 102 by isolating and analyzing component pixel subsets 138. For example, the component pixel subset 138*a* corresponding to the head or hair of potential subject 136*a* may correspond to hair of a length and shape very different than that of the subject 102 (who, as shown by component pixel subset 130*a*, is wearing a helmet). Similarly, the feet of potential subject 136*a*, as shown by component pixel subsets 138*b* and 138*c*, indicate roller skates, which the subject 102 is also not wearing (see component pixel subsets 130*h*, 130*i*). Similarly, the visual recognition system 114 may dismiss the potential subject 136*b* based on overall size (138*d*) or color/texture differences in the shirt of potential subject 136*b*.

Figure 6:
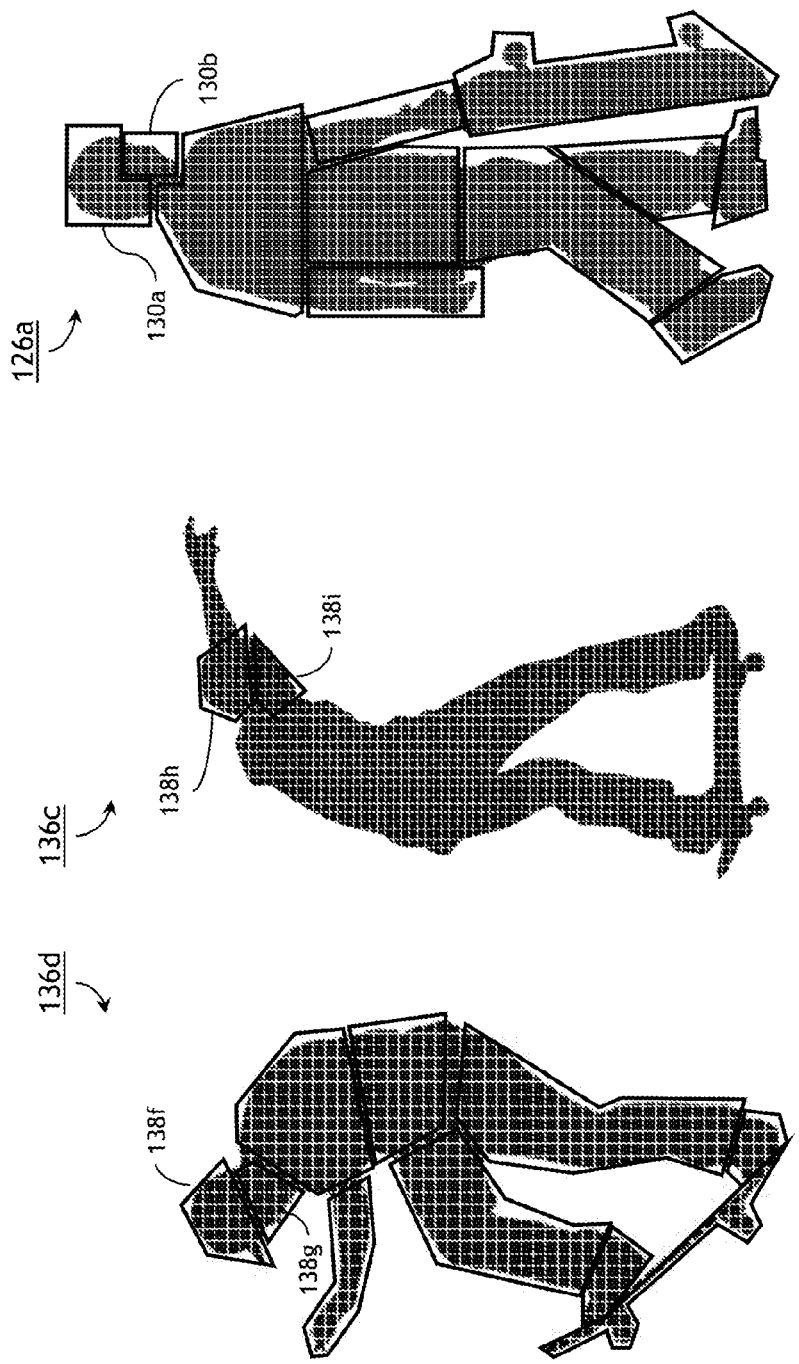

Referring to FIG. 6, the potential subject pixel set 136*d* may indicate a closer match to the subject pixel set 126*a* (i.e., a reference pixel set associated with the subject 102) than either pixel set 136*a* or 136*b*. However, the visual recognition system 114 may dismiss the potential subject pixel set 136*d* as a subject pixel set 126 based, for example, on comparisons of component pixel sets 138*f* and 130*a*, and 138*g* and 130*b*. As the potential subject 136*d* is wearing a baseball cap rather than a helmet, the potential subject 136*d* may be dismissed as a likely match for the subject 102. Similarly, the facial features identified within component pixel set 138*g* may not match those of the component pixel set 130*b* (i.e., the facial features of the subject 102). The potential subject pixel set 136*c*, however, may be identified to a sufficient confidence level as a match for the subject pixel set 126*a* (and therefore the subject 102) based on a comparison of, for example, component pixel sets 138*h* and 130*a* (corresponding to the helmet of the subject 102) and component pixel sets 138*i* and 130*b* (corresponding to the facial features of the subject 102).

Figure 7:
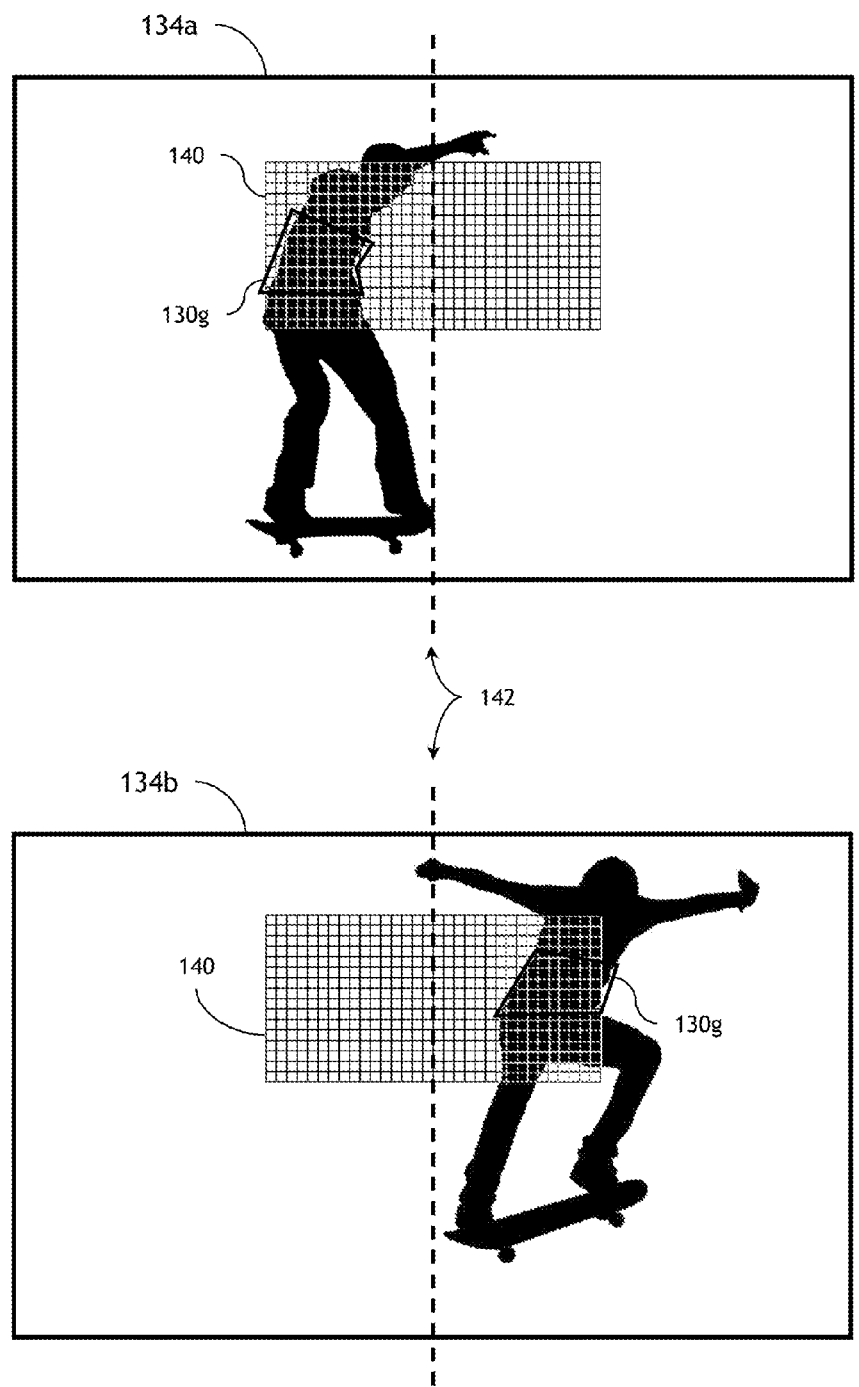

Referring to FIG. 7, the visual recognition module 114 of the UAV 100 may use pixel matching to track an identified, moving subject 102 by determining whether the subject tracking system 116 should adjust the current orientation (ex.—position, heading or velocity) of the UAV 100 in response to the movement of the subject 102. For example, frame 134*a* (captured by the camera 106 aboard the UAV 100) includes a subject pixel set 126 corresponding to the identified subject 102 currently being tracked by the UAV 100. The grid 140 represents a group of pixels near the center of the frame 134*a*, as represented by central axis 142. The majority of darker pixels at the left side of the grid 140 may be identified by the visual recognition system 114 as part of the subject pixel set 126 corresponding to the subject 102. Further analysis by the visual recognition system 114 may indicate that at least a portion of the pixels within the grid 140 are consistent with the component pixel set 130*g* corresponding to the lower torso of the subject 102. For example, the pixels within the component pixel set 130*g* may appear consistent in hue, texture, or reflectivity with reference component pixel sets stored in the memory 110 of the UAV 100, the reference component pixel sets based on reference images of the clothing of the subject 102. In the next frame 134*b*, the pixels at the left side of the grid 140 are consistent with the background of the frame 134*b*, while groups of pixels near the upper right of the grid 140 (and to the right of the central axis 142 of the frame 134*b*) may now be consistent with the subject pixel set 126 (and therefore with the subject 102). The visual recognition system 114 may conclude that the subject 102 is moving to the right with respect to the frame 134*b*, and that it may be desirable for the UAV 100 to rotate to its right (with respect to the yaw axis of the UAV 100) to keep the subject 102 centrally framed. The visual recognition system 114 may further note that pixels consistent with the component pixel set 130*g* corresponding to the lower torso of the subject 102 have moved to the right of the frame 134*b*, as well as slightly upward. If prior frames 134 have indicated consistent upward movement on the part of the subject 102 with respect to the frame 134, the subject tracking system 116 may direct the attitude control system 118 to rotate the UAV 100 upward (with respect to the pitch axis of the UAV 100).

Figure 8:
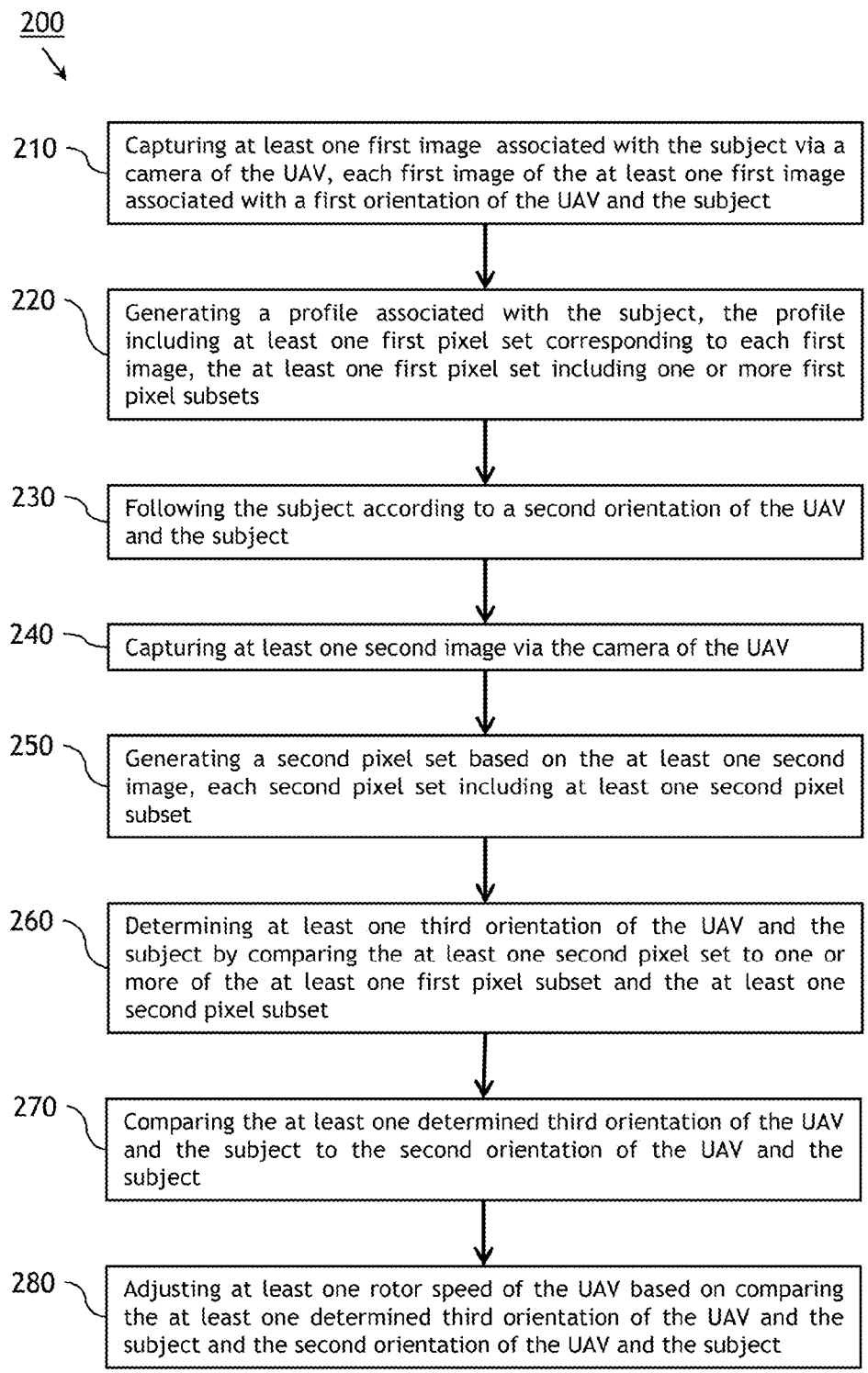
FIG. 8 is a process flow diagram illustrating a method of operation according to embodiments of the present disclosure.

FIG. 8 illustrates a process flow diagram of a method 200 for tracking a subject 102 via an unmanned aerial vehicle (UAV) 100 according to embodiments of the present disclosure. It is noted herein that the method 200 may be carried out utilizing any of the embodiments described previously. It is further noted, however, that method 200 is not limited to the components or configurations described previously as multiple components and/or configurations may be suitable for executing method 200.

At a step 210, the camera 106 of the UAV 100 captures a first image associated with the subject 102, each first image associated with a first orientation of the UAV 100 and the subject 102.

At a step 220, the visual recognition system 114 of the UAV 100 generates a profile associated with the subject 102, the profile including a reference pixel set 124 corresponding to each first image, the reference pixel set 124 including one or more reference pixel subsets 126. For example, the one or more reference pixel subsets 126 may correspond to a body part of the subject 102, an accessory of the subject 102, an article of clothing of the subject 102, a feature of the subject 102, or a reference pixel subset 126*b* adjacent to the reference pixel subset 126*a*.

At a step 230, the UAV 100 follows the subject 102 according to a predetermined orientation of the UAV 100 and the subject 102.

At a step 240, the camera 106 captures at least one second image.

At a step 250, the visual recognition system 114 generates a second pixel set 134 based on the at least one second image, each second pixel set 134 including at least one second pixel subset 136.

At a step 260, the visual recognition system 114 determines at least one current orientation of the UAV 100 and the subject 102 by comparing the at least one second pixel set 134 to one or more of a first pixel subset 124 and a second pixel subset 134. For example, the visual recognition system 114 may compare pixel sets or subsets based on a hue, a texture, a pattern, a position, or an edge. The visual recognition system 114 may compare the at least one second pixel set 134 to a reference pixel subset 124 associated with the subject 102, a component pixel subset 138 associated with the subject 102, or a non-subject pixel subset 128.

At a step 270, the subject tracking system 116 compares the determined current orientation of the UAV 100 and the subject 102 to the predetermined orientation of the UAV 100 and the subject 102.

At a step 280, the attitude control system 118 adjusts one or more rotor speeds of the UAV 100 (via the motors 122) based on the comparison of the determined current orientation of the UAV 100 and the subject 102 and the predetermined orientation of the UAV 100 and the subject 102. For example, the attitude control system 118 may adjust one or more rotor speeds of the UAV to keep the subject 102 centrally framed by the camera 106.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. An unmanned aerial vehicle (UAV), comprising:
at least one rotor fixed to an airframe, the at least one rotor coupled to one or more motors configured to drive the at least one rotor at at least one rotor speed;
an attitude control system fixed to the airframe and configured to:
determine at least one first orientation of the UAV;
adjust the first orientation by adjusting the at least one rotor speed via the one or more motors;
at least one camera attached to the airframe, the camera configured to:
capture at least one reference image, the reference image corresponding to at least one of a subject and a reference orientation of the UAV to the subject; and
capture at least one current image;
a visual recognition system operatively coupled to the camera and configured to:
generate at least one reference pixel set based on the reference image, the reference pixel set including at least one reference pixel subset (RPS) corresponding to at least one aspect of the subject;
generate at least one current pixel set based on the current image, the current pixel set including at least one of 1) a subject pixel subset (SPS) corresponding to the subject; 2) a non-subject pixel subset (NSPS), and 3) a potential subject pixel subset (PSPS);
classify the at least one PSPS as a SPS or a NSPS by comparing the PSPS to one or more of the at least one RPS and the at least one SPS; and
determine a current orientation of the UAV to the subject based on the at least one SPS;
at least one non-transitory memory coupled to the visual recognition system and configured to store one or more of the reference pixel set and the current pixel set; and
a subject tracking system operatively coupled to the visual recognition system and the memory and configured to:
define a target orientation of the UAV to the subject;
maintain the target orientation by directing the attitude control system to adjust the at least one rotor speed;
determine at least one position change of the UAV by comparing one or more of the target orientation and the current orientation; and
direct the attitude control system to adjust the at least one rotor speed based on the at least one position change.

2. The UAV of claim 1, wherein the visual recognition system is configured to classify the at least one PSPS as a SPS or a NSPS based on one or more of:
a first size of the PSPS relative to the associated current pixel set;
a first position of the PSPS relative to the associated current pixel set;
a first shape of the PSPS;
a first edge of the PSPS; and
comparing at least one first pixel of the PSPS with at least one second pixel of one or more of the SPS and the RPS.

3. The UAV of claim 1, wherein the at least one SPS includes at least one component pixel subset (CPS) corresponding to the at least one aspect.

4. The UAV of claim 3, wherein the at least one aspect includes at least one of a body part of the subject, an article of clothing of the subject, an accessory of the subject, and a distinguishing feature of the subject.

5. The UAV of claim 3, wherein the at least one aspect includes at least one of a color, a texture, a reflectivity, and a pattern.

6. The UAV of claim 3, wherein the visual recognition system is configured to determine a current orientation of the UAV to the subject based on one or more of:
a second size of the CPS relative to the associated SPS;
a second position of the CPS relative to the associated SPS;
a second shape of the CPS;
a second edge of the CPS; and
comparing at least one of a first CPS of a first SPS and a second CPS of a second SPS, the first CPS and the second CPS corresponding to at least one first aspect of the at least one aspect.

7. The UAV of claim 1, wherein the visual recognition system is configured to determine a current orientation of the UAV to the subject based on one or more of:
   a third size of the SPS relative to the associated current pixel set;
   a third position of the SPS relative to the associated current pixel set;
   a third shape of the SPS;
   a third edge of the SPS; and
   comparing at least one of a third SPS of a first current pixel set and a fourth SPS of a second current pixel set.

8. The UAV of claim 1, wherein the subject tracking system is configured to maintain the target orientation by framing the subject centrally in the current image.

9. The UAV of claim 1, wherein the subject tracking system is configured to determine the at least one position change by comparing at least one of a first current orientation corresponding to a first current image and a second current orientation corresponding to a second current image.

10. The UAV of claim 1, wherein the at least one position change is a position change, and the subject tracking system is configured to determine the at least one position change by determining at least one of a second position change of the subject, a heading change of the subject, and a velocity change of the subject.

11. The UAV of claim 1, wherein the at least one position change is associated with at least one of a heading of the UAV, a velocity of the UAV, and a rotational orientation of the UAV.

12. A method for tracking a subject via an unmanned aerial vehicle (UAV), the method comprising:
   capturing at least one reference image of a subject via a camera attached to a UAV, the reference image corresponding to a reference orientation of the UAV to the subject;
   generating at least one reference pixel set based on the reference image, the reference pixel set including at least one reference pixel subset (RPS) corresponding to an aspect of the subject;
   determining at least one target orientation of the UAV to the subject;
   maintaining the target orientation by adjusting at least one of a position of the UAV, a heading of the UAV, and a rotational orientation of the UAV;
   capturing at least one current image via the camera;
   generating at least one current pixel set based on the current image, the current pixel set including at least one of:
      a subject pixel subset (SPS) corresponding to at least one of the subject and a current orientation of the UAV to the subject;
      a non-subject pixel subset (NSPS) not corresponding to the subject; and
      a potential subject pixel subset (PSPS);
   classifying the at least one PSPS as a SPS or a NSPS by comparing the PSPS to one or more of the at least one RPS and the at least one SPS;
   determining the current orientation based on the at least one SPS;
   determining at least one position change of the UAV by comparing one or more of the target orientation and the current orientation; and
   adjusting at least one of the position, the heading, and the rotational orientation based on the at least one position change.

13. The method of claim 12, wherein classifying the at least one PSPS as a SPS or a NSPS by comparing the PSPS to one or more of the at least one RPS and the at least one SPS includes:
   comparing at least one first pixel of the PSPS with at least one second pixel of one or more of the SPS and the RPS.

14. The method of claim 12, wherein generating at least one current pixel set based on the current image includes:
   defining at least one component pixel set (CPS) of the SPS, the CPS corresponding to the at least one aspect.

15. The method of claim 14, wherein determining the current orientation based on the at least one SPS includes:
   determining the current orientation based on at least one of a size of the CPS relative to the associated SPS, a position of the CPS relative to the associated SPS, a shape of the CPS, and an edge of the CPS.

16. The method of claim 14, wherein determining the current orientation based on the at least one SPS includes:
   comparing at least one of a first CPS of a first SPS and a second CPS of a second SPS, the first CPS and the second CPS corresponding to at least one first aspect of the at least one aspect.

17. The method of claim 12, wherein determining the current orientation based on the at least one SPS includes:
   determining the current orientation based on at least one of a size of the SPS relative to the associated current pixel set, a position of the SPS relative to the associated current pixel set, a shape of the SPS, and an edge of the SPS.

18. The method of claim 12, wherein determining the current orientation based on the at least one SPS includes:
   comparing at least one of a third SPS of a first current pixel set and a fourth SPS of a second current pixel set.

19. The method of claim 12, wherein determining the current orientation based on the at least one SPS includes:
   comparing at least one of a first current orientation corresponding to a first current image and a second current orientation corresponding to a second current image.

20. The method of claim 12, wherein determining at least one position change of the UAV by comparing one or more of the target orientation and the current orientation includes:
   determining at least one of a position change of the subject, heading change of the subject, and a velocity change of the subject.

* * * * *